United States Patent
Wozniak et al.

(10) Patent No.: US 7,251,030 B2
(45) Date of Patent: Jul. 31, 2007

(54) DIGITAL WORKFLOW INDEPENDENT OUTPUT MATCHING

(75) Inventors: Terry Wozniak, Springfield, OH (US); Michael J. Piatt, Dayton, OH (US); Joshua H. Howard, Kettering, OH (US)

(73) Assignee: Eastman Kodak Company, Rochester, NY (US)

( * ) Notice: Subject to any disclaimer, the term of this patent is extended or adjusted under 35 U.S.C. 154(b) by 832 days.

(21) Appl. No.: 10/336,133

(22) Filed: Jan. 3, 2003

(65) Prior Publication Data

US 2004/0130719 A1    Jul. 8, 2004

(51) Int. Cl.
*G01J 3/46*    (2006.01)
*G06F 15/00*    (2006.01)

(52) U.S. Cl. .................. 356/402; 356/402; 356/446; 356/328; 358/1.13; 358/1.9; 358/500; 358/504; 358/402; 358/446; 358/501; 358/1.6; 702/81; 347/3

(58) Field of Classification Search ............... 358/1.13, 358/1.9, 497, 402, 500, 501, 504, 473, 484, 358/298, 1.6; 347/27, 3; 356/402, 328; 702/81; 395/100; 382/167
See application file for complete search history.

(56) References Cited

U.S. PATENT DOCUMENTS

| | | | | |
|---|---|---|---|---|
| 6,028,682 A * | 2/2000 | Ott et al. | ..................... | 358/497 |
| 6,784,994 B1 * | 8/2004 | Kritchman et al. | ......... | 356/402 |
| 7,031,022 B1 * | 4/2006 | Komori et al. | .............. | 358/1.9 |
| 2001/0028471 A1 * | 10/2001 | Hirokazu | .................... | 358/1.13 |
| 2002/0008880 A1 * | 1/2002 | Dewitte et al. | .............. | 358/1.9 |
| 2002/0180997 A1 * | 12/2002 | Rozzi | .......................... | 358/1.9 |
| 2002/0193956 A1 * | 12/2002 | Van de Capelle et al. | .... | 702/81 |
| 2003/0117639 A1 * | 6/2003 | Milton et al. | .............. | 358/1.13 |
| 2004/0119993 A1 * | 6/2004 | Edge et al. | .................. | 358/1.9 |
| 2006/0007252 A1 * | 1/2006 | Mahy et al. | ................... | 347/3 |

* cited by examiner

*Primary Examiner*—Aung S. Moe
*Assistant Examiner*—Ashish K. Thomas

(57) ABSTRACT

The present invention provides for the creation and use of a non-linearized, paper specific, digital workflow independent color profile which can be used to create proofs based on the raw output data of the source process. Such a profile would have the advantage of not having to have account for the intermediate workflow steps such as linearization, color correction, sharpening, ink limiting, color separation, dithering or color transformation because the gamut mapping would utilize the discrete output tones of the resulting data sent to the source device.

13 Claims, 3 Drawing Sheets

DIGITAL WORKFLOW INDEPENDENT OUTPUT MATCHING

TECHNICAL FIELD

The present invention relates to image processing and, more particularly, to a method of representing a continuous tone image to reproduce image character and image color.

BACKGROUND ART

In traditional offset printing, a facsimile of the final document to be printed for the purpose of proofing may typically be created on a slow, high quality, low volume desktop device for customer approval. It is the intent of the offset press to match this proof. Such a proof is called a contract proof. Until recently, the resolution of the typical offset press greatly exceeded the resolution of most commercial "off the shelf" inkjet printers. Prior to the use of digital inkjet proofs, the contract proof may have been created using the exact film that would be used to image the plates for the offset run. By using similar ink, and similar media, the high quality proofing system could be made to match the offset press in both dot structure and color. The customer may sign the single copy produced by the proofer and attend the press run to make sure that the offset press output matched the proof prior to the start of mass production. Proof copies would typically not be created directly on the press due to the cost, waste, make-ready time and lost production time. The offset press is designed to make thousands or more copies while the high quality proofer would be optimized for creating just a single copy.

Present high quality inkjet proofers, on the order of 2400 or more dots per inch (dpi) have greatly reduced the time and expense involved in creating an offset proof. These high quality devices can now mimic the high quality achieved on an offset press. However, a digital press or high speed digital inkjet presses print at a resolution lower than the desktop inkjet proofing devices. A proof of the continuous tone data produced by one of these devices exceeds the quality and character of output achievable on the digital press.

In order to better mimic the output of the digital press and to allow the digital press to meet or exceed the quality found on these proofs, the apparent resolution of these desktop proofing devices must be lowered to match that of the digital press. This can be best accomplished on devices that have resolutions which are multiples of 300 dpi. Merely reducing the resolution of the data to 300 dpi will not reproduce the apparent graininess of the digital press. The continuous tone data will still be reproduced at the selected output resolution, resulting in an output which approximates photographic quality. In order to simulate the graininess of the digital press on these high quality devices, the continuous tone files must also be limited to the number of discrete colors that the digital press can reproduce.

It is seen, therefore, that it would be desirable to be able to separate the digital workflow from the color output, to more precisely match the proofing copy to the final print run.

SUMMARY OF THE INVENTION

The present invention addresses the problem of maintaining a library of separate color mapping definitions, each valid only for a specific digital workflow. The application of different linearization curves, different dithering algorithms, color separation techniques, sharpening filters and other integrated digital manipulations effect the output such that a different gamut is generated with each combination of variables. This gamut mapping technique records the resulting output in such a way that regardless of the manipulations applied prior to output, an accurate facsimile can be generated on a device capable of reproducing the source data's output.

In accordance with one aspect of the present invention, the digital workflow is separated from the color output by measuring the absolute output characteristics of the device. One International Color Consortium (ICC) profile can now be created to reproduce the output characteristics regardless of the steps taken during the workflow that affect the output. This is accomplished by profiling the output of the device just prior to printing, separating out the effects of various digital manipulations.

Other objects and advantages of the invention will be apparent from the following description, the accompanying drawings and the appended claims.

DETAILED DESCRIPTION OF THE PREFERRED EMBODIMENTS

Figure 1:
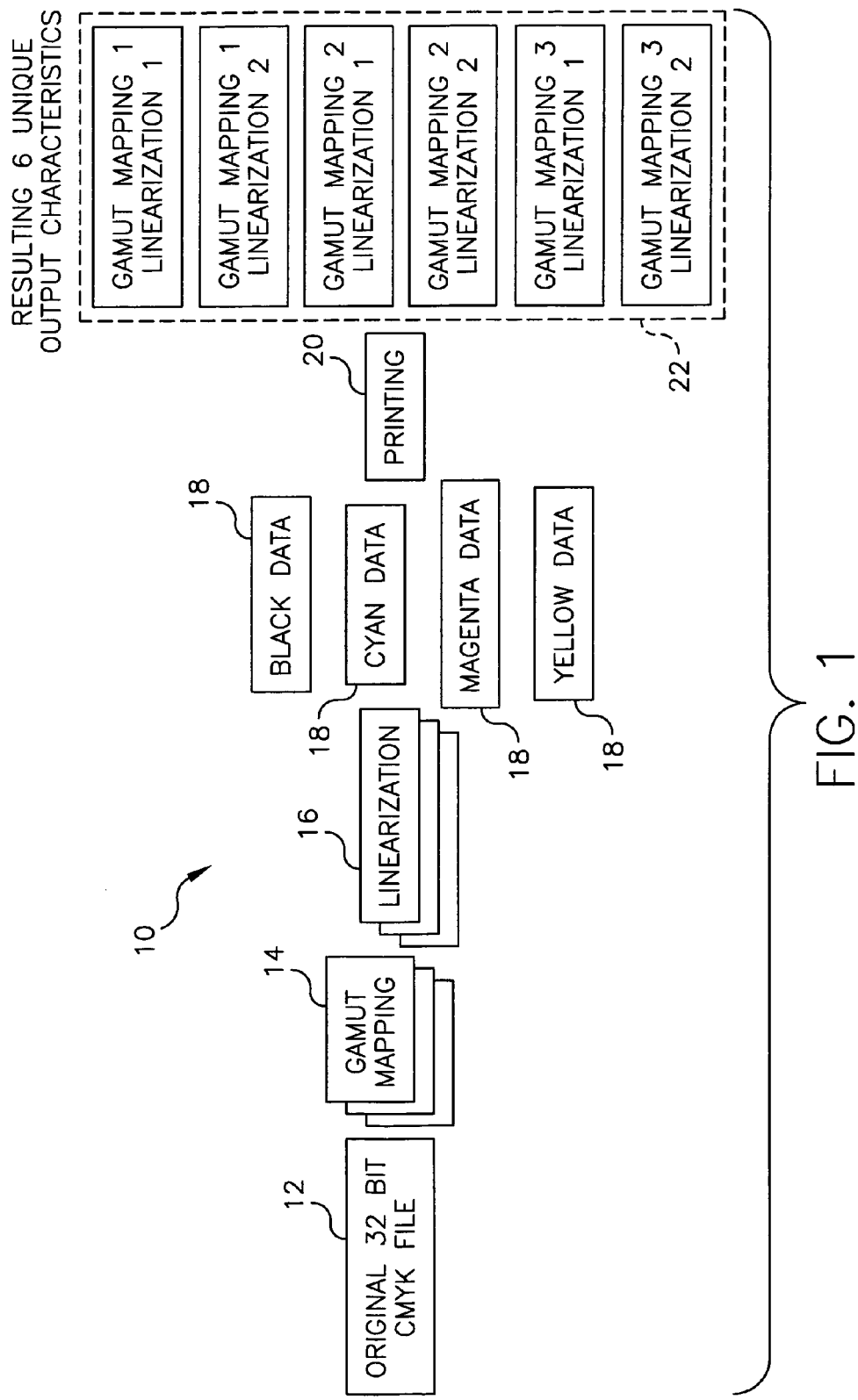
FIG. 1 illustrates the impact of digital workflow variables on an output.

The present invention provides for the creation and use of a non-linearized, paper specific, digital workflow independent color profile which can be used to create proofs based on the raw output data of the source process. Such a profile would have the advantage of not having to have account for the intermediate workflow steps such as linearization, color correction, sharpening, ink limiting, color separation, dithering or color transformation because the gamut mapping would utilize the discrete output tones of the resulting data sent to the source device.

In order to simulate the graininess of the digital press on high quality devices, the continuous tone files must be limited to the number of discrete colors that the digital press can reproduce. There are several methods that can be employed to enhance the graininess of the resulting proofer output. Prior to printing on the digital press, the output data is stored in a binary format representing discrete drops of ink. A single bit file is sent to each printhead (C, M, Y & K) to represent which drops will fall to the page and which will not. This data is stored as separate binary files, which cannot be directly combined into any conventional file format or sent directly to any other printing device.

This discrete data can be mathematically recombined into a continuous tone file format such that a value can be registered for the number and combination of drops of ink that would fall into each pixel location. Such a continuous tone file could then be accessed and manipulated in conventional data preparation programs such as Adobe Photoshop, and be used in conventional proofing workflows. The result of using such a file in a conventional proofing process allows not only the color of the digital press to be captured, but also the character and apparent quality as well.

ICC workflows are industry standard ways to match color from one device to another. An ICC workflow depends on profiling an output device under known conditions, and capturing the color output characteristics of that device under those conditions. Profiles must be created for each different set of conditions for printers with digital workflows. If the linearization, color separation or other variables in the workflow are changed, a new ICC profile must be created to capture the device's new output characteristics.

The present invention separates the digital workflow from the color output by measuring the absolute output characteristics of the device. In accordance with the present invention, one ICC profile can be created to reproduce the output characteristics, regardless of the steps taken during the workflow that affect the output. This is accomplished by profiling the output of the device just prior to printing, separating out the effects of various digital manipulations. In workflows that allow access to exact output data that will be fed to the output device, the present invention greatly reduces the complexity and workflow variables experienced during traditional proofing workflows.

Some output devices have a number of imaging variables that can alter the possible imaging characteristics such as, but not limited to: resolution, linearization, gamut mapping, sharpening, and dithering, as illustrated in FIG. 1. Each combination of these variables may impact the output characteristics enough so that a library of ICC profiles, or other gamut mapping files, would have to be produced, stored and maintained. The correct ICC profile would then need to be located to be used whenever a given workflow was selected for outputting data. There are a large number of possible outcomes and it becomes cumbersome to archive and associate a given ICC profile or gamut map to each individual file or set of files to be processed and printed on an output device.

As illustrated by workflow 10 of FIG. 1, an original 32-bit CMYK file 12 is input to a gamut mapping step at 14. Such gamut mapping techniques and workflows have typically resolved the problem of the large number of possible outcomes by limiting the number of variables, and thus limiting the ability to optimize the output. These limited number of workflows can then be characterized by gamut mapping techniques or ICC profiles. After applying gamut mapping at step 14, linearization is applied at step 16. The data for each color at step 18 is input to the printing step at 20, to determine the resulting unique output characteristics at 22.

On offset presses, and many other output devices, the combinations of colors that can be produced in a single pixel location exceed a million. Measuring and cataloging the different combinations that such a device could produce would be too cumbersome. However, on some digital color output devices which have many imaging variables in their workflows, but lower resolutions, the resolution and potential number of combinations of ink in a single pixel location is limited enough to make measuring the output response of each of these combinations practical.

In the existing art, advanced proofing systems with resolutions and/or pixel combinations exceeding that of the source device make it possible and practical to produce this limited number of outcomes on a pixel by pixel basis. This is accomplished by capturing at a macro level the cumulative effects of the limited number of output combinations that occur at the micro level. For example, an output device that has a resolution of 300×600 dpi and 4 inks would have a total combination of 81 different possible outcomes at the micro level for each square 300 dpi pixel. The odd resolution can be resolved by looking at the printer as being able to produce 3 distinct tone levels for each given pixel. The current state of the art does not easily or commonly support capturing color information of a single pixel location, favoring the process of averaging a number of neighboring pixels to capture tone and color information at more of a macro level. By grouping like pixels together and measuring the tone response on a macro level, this information can be used to record the output devices gamut characteristics, possibly in an ICC profile.

Once a transformation from the distinct number of tones has been created from the data that creates such tones to another color space, usually device independent, it can be used to convert the raw data into such a device-independent color space. Once expressed in device-independent color space, the data can be converted to any destination through common ICC profile transformations.

Figure 2A:
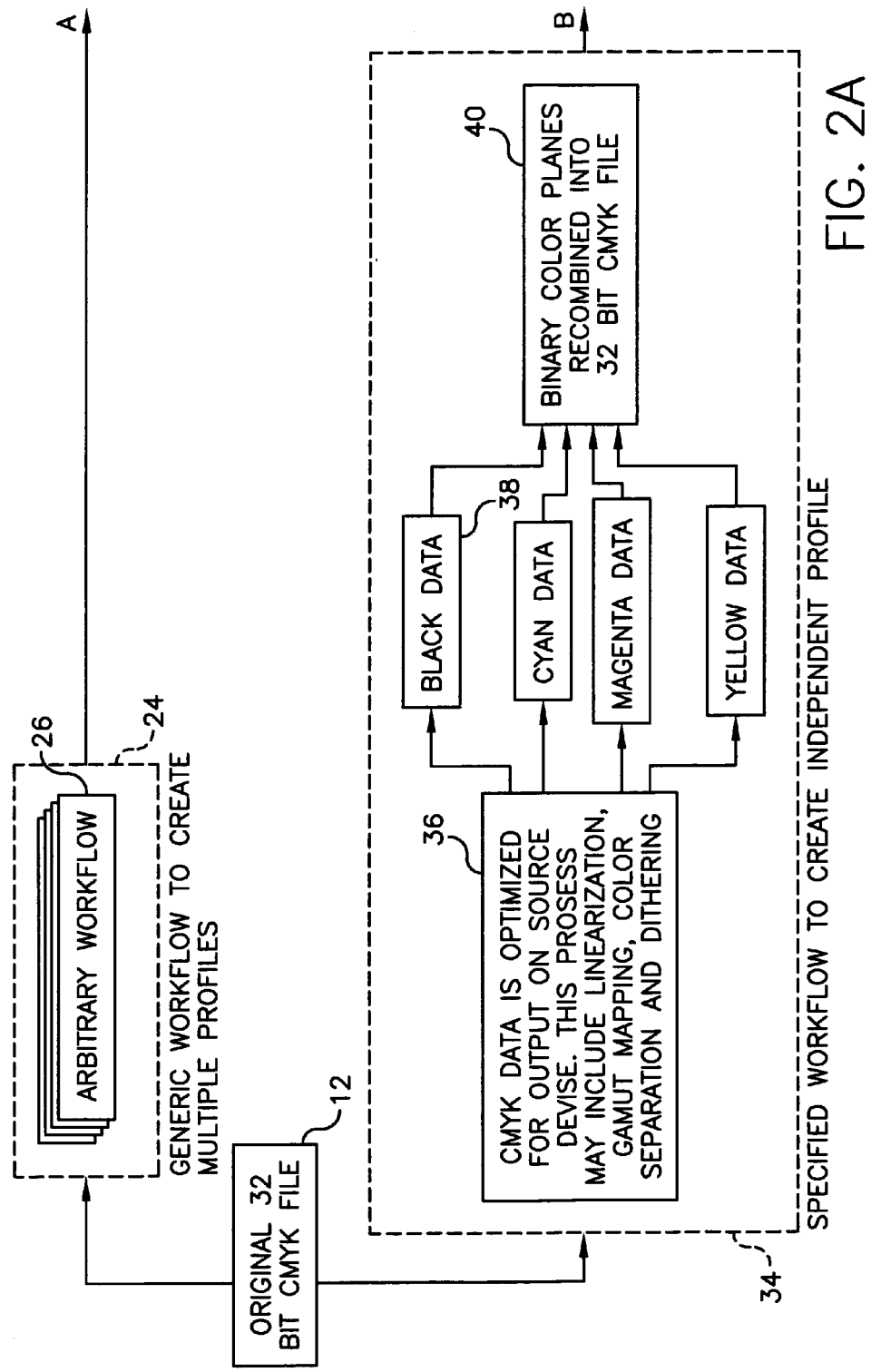
FIG. 2 illustrates a workflow in accordance with the present invention, to enable color matching by applying the concepts of the present invention.
Figure 2B:
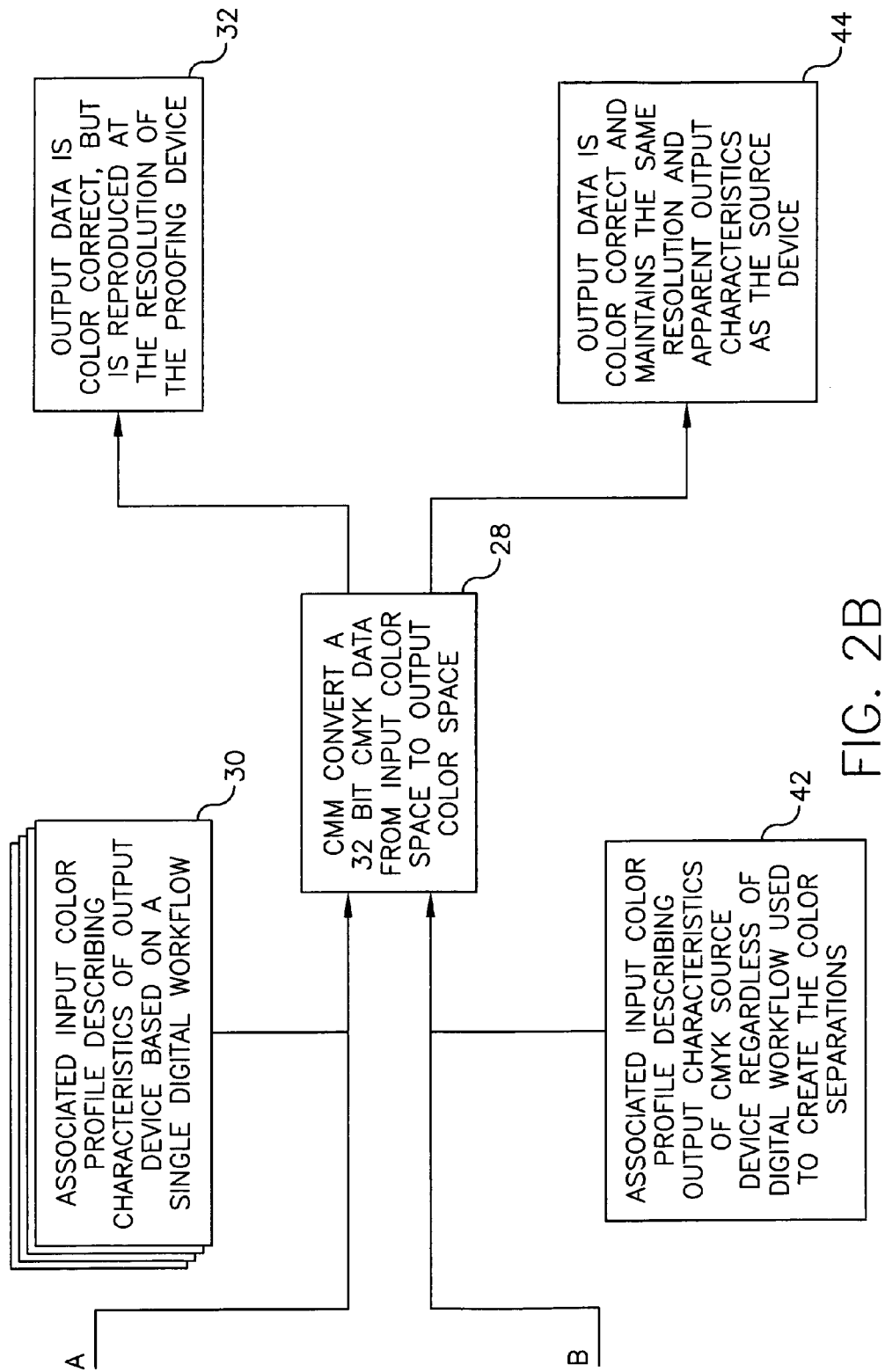

Referring now to FIG. 2, the present invention greatly simplifies the previous proofing workflow 10 of FIG. 1, by providing a single transform to enable color matching, with the comparison illustrated by the workflow diagram of FIG. 2. The workflow of the present invention requires a single ICC, as compared to an ICC for every permutation of imaging variables as required by the prior art. In the prior art, the generic workflow portion 24 of FIG. 2 for creating multiple profiles, is only valid for the specific workflow in which the profile was created. The 32-bit CMYK image 12 is manipulated in an arbitrary manner at block 26, and is then submitted to the color management module (CMM) at block 28 with two profiles. The associated input color profile describing characteristics of the output device based on a single digital workflow is provided at block 30. The two profiles submitted to the CMM, then, are the output profile of the device, i.e., the proofing printer, and the input profile that is associated, i.e., created in the same arbitrary way that the input CMYK image was manipulated, with the workflow. The resulting proof at block 32 is one that is color correct but is reproduced at the resolution of the proofing device rather than the source device.

The present invention, illustrated by the portion 34 of the specified workflow to create independent profile, is valid for any workflow within the same paper and ink group. In accordance with the present invention, the original 32-bit CMYK image at 12 can be processed in multiple manners, including but not limited to linearization, gamut mapping, color separation, and dithering, as represented by block 36. The CMYK data is optimized for output on the source device for the colors at 38, and the binary color planes are recombined into a 32-bit CMYK file at 40. Regardless of the process used at block 36, there is still only one input profile needed when it is submitted to the CMM at block 28. As shown by block 42, the associated color input color profile describes the output characteristics of the CMYK source device, regardless of the digital workflow used to create the color separations. The CMM profiles are the output profile of the proofing printer and the input profile, which is only associated with the paper and ink and can be used for any workflow within those parameters. The resulting proof is one that is color correct and maintains the same resolution and apparent output characteristics as the source device.

The reason only one transformation is needed with this invention is a result of the inventive concept that any file that would be printed would be comprised of an x-bit n-color file. Because of this, the transformation that is applied to these n-color planes need only map the n-possible color combinations to the independent color space. To do so, a transformation is created on the micro level. That is, a transformation is created that works with an x-bit depth, n-possible colors to produce and output characteristics of the press. If the transformation is created using the x-bit depth and the n-possible colors, then that transformation will work for any file coming in that has, at most, x-bit depth, and, at most, n-possible colors. With this, the workflow that creates the x-bit n-color combination planes is irrelevant because the transformation is created to work with such files.

One of the inventive features of this process is the teaching that a large printed areas of homogeneous pixels provide relevant information of single pixel color response. This is very significant because color measurement apparatus, such as spectrophotometers, require significant target area for accuracy. Color information obtained from large patches of identical pixels, one for each of the various combinations of primary inks, accurately represent single pixels of the same primary ink content.

The problem with the workflow 24 of the prior art is that the transformations are only valid for the exact workflow with which they were created. This means that for each ink-paper combination, an entire library of transformations must be stored. The workflow of the present invention eliminates the need for a library of transformations for each ink-paper combination. With this invention, only one transformation is needed for each ink-paper combination. Also, this invention removes the workflow from the transformation, as described above.

The invention has been described in detail with particular reference to certain preferred embodiments thereof, but it will be understood that modifications and variations can be effected within the spirit and scope of the invention.

What is claimed is:

1. A method for generating a workflow for proofing, the method comprising the steps of:
   identifying a substrate;
   printing all possible colorant versus substrate combinations on the identified substrate;
   measuring the printed combinations on a device capable of relating input data to a device-independent representation, to create a single transformation valid for any ready-to-print file created for printing on the identified substrate; and
   converting an arbitrary ready-to-print image file for a specific set of colorants and on a specified substrate into an indexed file, wherein the step of converting to an indexed file comprises the steps of:
   selecting a printed combination for each pixel;
   finding each indexed reading for the selected combination; and
   manipulating the newly created index file for output to another device.

2. A method for generating a workflow for proofing on a device, the method comprising the steps of:
   providing a digital workflow and a color output for a first device;
   separating the digital workflow from the color output by measuring output characteristics of the first device;
   creating a single International Color Consortium profile to reproduce the output characteristics of the first device regardless of the digital workflow steps that affect the color output, by profiling the output of the first device just prior to printing and using this discrete point profile as an input profile to a color management module acting upon an arbitrary ready-to-print image data intended for the first printing device in order to accurately reproduce the image data on a second device.

3. A method as claimed in claim 2 further comprising the step of printing all possible colorant versus substrate combinations at a macro level, composed of multiple identical pixels, to derive color values for use at a micro, or single pixel, level.

4. A method as claimed in claim 3 further comprising the step of using a spectrophotometer to measure the printed combinations.

5. A method as claimed in claim 4 wherein the step of using a spectrophotometer to measure the printed combinations further comprises the step of measuring printed combinations to generate values for micro, individual pixel, measurements.

6. A method for generating a workflow for proofing, the method comprising the steps of:
   identifying a substrate;
   printing all possible colorant versus substrate combinations on the identified substrate;
   measuring the printed combinations on a device capable of relating input data to a device-independent representation, to create a single transformation valid for any ready-to-print file created for printing on the identified substrate; and
   converting a created ready-to-print file into an indexed file and manipulating the index file for output to another device.

7. A method as claimed in claim 6 wherein the device capable of relating input data to a device-independent representation comprises a spectrophotometer.

8. A method as claimed in claim 6 wherein the step of printing further comprises the step of printing all possible colorant versus substrate combinations at a macro level, composed of multiple identical pixels, to derive color values for use at a micro, or single pixel, level.

9. A method as claimed in claim 6 wherein the step of measuring further comprises the step of measuring printed combinations to generate values for micro, individual pixel, measurements.

10. A method as claimed in claim 6 wherein the step of identifying a substrate comprises the step of consistently matching color of the identified substrate through the single transformation applied to all pixels in the data file.

11. A method as claimed in claim 10 further comprising the step of measuring the substrate color value and applying it in the single transformation.

12. A method as claimed in claim 10 further comprising the step of adjusting all possible colorant values based upon substrate color.

13. A method as claimed in claim 12 further comprising the step of converting an arbitrary ready-to-print image file for a specific set of colorants and on a specified substrate into an indexed file.

* * * * *